US012566936B2

(12) United States Patent (10) Patent No.: US 12,566,936 B2
Huigens (45) Date of Patent: Mar. 3, 2026

(54) GENERATING A MEDIA-BASED UNIQUE OBJECT IDENTIFIER

(71) Applicant: PWCC Marketplace, LLC, Tigard, OR (US)

(72) Inventor: Brent Huigens, Portland, OR (US)

(73) Assignee: PWCC MARKETPLACE, LLC, Tigard, OR (US)

( * ) Notice: Subject to any disclaimer, the term of this patent is extended or adjusted under 35 U.S.C. 154(b) by 0 days.

(21) Appl. No.: 18/096,465

(22) Filed: Jan. 12, 2023

(65) Prior Publication Data

US 2023/0222310 A1 Jul. 13, 2023

Related U.S. Application Data

(60) Provisional application No. 63/298,845, filed on Jan. 12, 2022.

(51) Int. Cl.
*G06K 19/077* (2006.01)
*G06K 7/14* (2006.01)
(52) U.S. Cl.
CPC ....... *G06K 19/0776* (2013.01); *G06K 7/1417* (2013.01)
(58) Field of Classification Search
CPC .......................... G06K 19/0776; G06K 7/1417
See application file for complete search history.

(56) References Cited

U.S. PATENT DOCUMENTS 8,360,207 B1 1/2013 Goodwin
8,502,644 B1 8/2013 Newman et al.
(Continued)

FOREIGN PATENT DOCUMENTS

AU 2017245132 A1 * 10/2018 ............ B25J 19/022
EP 1071496 B1 6/2002
(Continued)

OTHER PUBLICATIONS

PSA sports promotional video showing unwrapping and generating and labeling identifiers of unknown products (i.e. cards) (Year: 2009)—Youtube video—PSA Sports Trading Card Grading Process—Published—Mar. 16, 2009 reproduced Author: bpnsirdiealot.*
(Continued)

*Primary Examiner* — Rufus C Point

(74) *Attorney, Agent, or Firm* — Kilpatrick Townsend & Stockton LLP

(57) ABSTRACT

A method of uniquely identifying a previously unknown object includes generating a media record of an unveiling of the previously unknown object to become an identified object with a known identity, generating a unique identifier of the identified object, associating the unique identifier of the identified object with the identified object itself, and associating the media record of the unveiling of the unveiled object with the unique identifier. Further methods of verifying genuineness of collectors' items includes generating a unique identifier, associating the unique identifier with a unique item at a time in which the unique item is unpackaged during a video recording, associating the unique identifier with additional information about the time at which the unique item is unpackaged, printing the unique identifier on a sticker, and adhering the sticker with the unique identifier to a portion of the item.

19 Claims, 4 Drawing Sheets

(56) References Cited

U.S. PATENT DOCUMENTS

| | | | |
|---|---|---|---|
| 11,374,756 | B1 | 6/2022 | Myers et al. |
| 2007/0187266 | A1* | 8/2007 | Porter .................... B42F 7/025 |
| | | | 206/459.5 |
| 2010/0270372 | A1* | 10/2010 | Bae ........................ G06Q 10/06 |
| | | | 235/375 |
| 2015/0142753 | A1* | 5/2015 | Soon-Shiong ...... G06F 16/2272 |
| | | | 707/673 |
| 2015/0248589 | A1* | 9/2015 | Broache .................. G06F 18/22 |
| | | | 382/182 |
| 2017/0174439 | A1* | 6/2017 | Ripley ...................... B07C 3/10 |
| 2017/0213265 | A1 | 7/2017 | Masherah et al. |
| 2018/0218320 | A1* | 8/2018 | Lee .................... G06K 17/0022 |
| 2018/0246894 | A1* | 8/2018 | Kass ................. G06F 16/24578 |
| 2019/0095928 | A1* | 3/2019 | Lane ...................... G06K 19/10 |
| 2019/0156086 | A1* | 5/2019 | Plummer ............... H04N 23/45 |
| 2019/0268650 | A1* | 8/2019 | Avedissian ............ G06F 3/0481 |
| 2020/0290808 | A1 | 9/2020 | Oh et al. |
| 2021/0272176 | A1 | 9/2021 | Beguesse |
| 2022/0122130 | A1* | 4/2022 | Porter ................ G06Q 30/0185 |
| 2022/0327591 | A1 | 10/2022 | Diaz et al. |
| 2022/0343483 | A1* | 10/2022 | Desai ........................ G06T 5/90 |
| 2023/0005001 | A1* | 1/2023 | Watts ................. G06Q 30/0278 |
| 2023/0005604 | A1 | 1/2023 | Nagasawa |

FOREIGN PATENT DOCUMENTS

| | | | | |
|---|---|---|---|---|
| JP | 2020181502 | A | * 11/2020 | |
| WO | WO-2017172782 | A1 | * 10/2017 | ........... B25J 19/022 |
| WO | 2022055723 | A1 | 3/2022 | |

OTHER PUBLICATIONS

Author: Cardmarket—Magic, Title: Card Grading Behind the Scenes, Jan. 6, 2022, published on Youtube.com; published on Youtube.com (Year: 2022).*

Author: Picksburg, Title: Sports Card Grading Company Live Stream Transparent Grading Team, Oct. 29, 2021, published on Youtube.com (Year: 2021) (Year: 2021).*

Method, System, and Medium for Displaying Automatically Pushing Information Related to Items Offered for Sale in a Network-based Marketplace, eBay, News Bites—Computing & Information [Melbourne], Apr. 29, 2021.

U.S. Appl. No. 18/142,507, Final Office Action mailed on Sep. 2, 2025, 18 pages.

U.S. Appl. No. 18/142,507, Non-Final Office Action mailed on Mar. 6, 2025, 24 pages.

* cited by examiner

200

| Unique Card ID | B447A400 | B447A401 | CC819678 | CC819679 | U4782 | U4783 | C889XB47 | C889XB48 |
|---|---|---|---|---|---|---|---|---|
| Card Description | xxxxxx | xxxxx | xxxxx | xxxxx | xxxxx | xxxxx | xxxxx | xxxxx |
| Breaker Name | xxx | xxx | xxx | xxx | xxx | xxx | xxx | xxx |
| Breaker ID | B0017 | B0017 | B0017 | B0017 | B0017 | B0017 | B0017 | B0017 |
| Date unpackaged | 1/9/2021 | 1/9/2021 | 1/17/2023 | 1/17/2023 | 1/6/2023 | 1/6/2023 | 1/22/2023 | 1/22/2023 |
| Time unpackaged | 8:36:07 am | 8:37:15 am | 2:22:01 pm | 2:22:58 pm | 10:48:02 am | 10:49:16 am | 5:19:34 pm | 5:29:11 pm |
| Location unpackaged | STL loc. 227 | STL loc. 227 | PDX loc. 19 | PDX loc. 19 | PDX loc. 19 | PDX loc. 19 | SEA loc 6 | SEA loc 6 |
| Video Index | 14:44 | 15:11 | 16:22 | 17:12 | 03:13 | 03:77 | 11:19 | 11:99 |
| Audio File Index | 14:44 | 15:11 | 16:22 | 17:12 | 03:13 | 03:77 | 11:19 | 11:99 |
| Still Image Index | B667 | B675 | YX19 | YX29 | AA19 | AA31 | XC12 | XC23 |
| Expert 1 Name | xxx | xxx | | | | | | |
| Expert 1 Grade | MINT 9 | EX 5 | | | | | | |
| Expert 1 date | 1/9/2021 | 1/9/2021 | | | | | | |
| Expert 2 Name | xxx | | | | | | | |
| Expert 2 Grade | MINT 9 | | | | | | | |
| Expert 2 date | 6/22/2022 | | | | | | | |

310  Generate unique ID

320  Associate unique ID with unpackaged item

330  Store information regarding unpackaged item

340  Print sticker with unique identifier

350  Place item in pouch and seal pouch

360  Identify pouch with unique identifier sticker

GENERATING A MEDIA-BASED UNIQUE OBJECT IDENTIFIER

CROSS-REFERENCE TO RELATED APPLICATIONS

This application claims benefit of U.S. Provisional Application 63/298,845, entitled GENERATING A MEDIA-BASED UNIQUE OBJECT IDENTIFIER, filed Jan. 12, 2022, the disclosure of which is incorporated herein by reference.

FIELD OF THE INVENTION

This disclosure is related to identifying objects, and, more particularly, to a system for generating unique identifiers of objects using multi-media.

BACKGROUND

Physical objects are by definition unique, meaning there are no two that are exactly alike. Some objects that are seemingly identical may include unique identifiers. For instance, two otherwise identical watches may be marked with different serial numbers, allowing the watches to be easily distinguished.

Most objects have no unique identifier, however, making it very difficult to tell one object from another. Trading cards are examples of objects having no unique identifier. For these reasons, two otherwise identical cards may be very difficult to distinguish and may require an expert in card identification to do so.

The resale market for trading cards is very robust, which also means that the market is ripe for fakes, or non-genuine goods, entering the market. Using an expert to identify that a particular card is genuine adds a layer of expense and complexity, and it may be appropriate for cards having significant value. Most cards in the trading card market will not have their genuineness verified by an expert, though, and therefore there is always a risk in a transaction that a particular card has been substituted or faked.

Embodiments according to this disclosure address these and other shortcomings of conventional multi-lot auctions.

BRIEF DESCRIPTION OF THE DRAWINGS

FIG. 2 is a sample database of information to be stored about a unique object, according to embodiments of the invention.

DESCRIPTION

Figure 1:
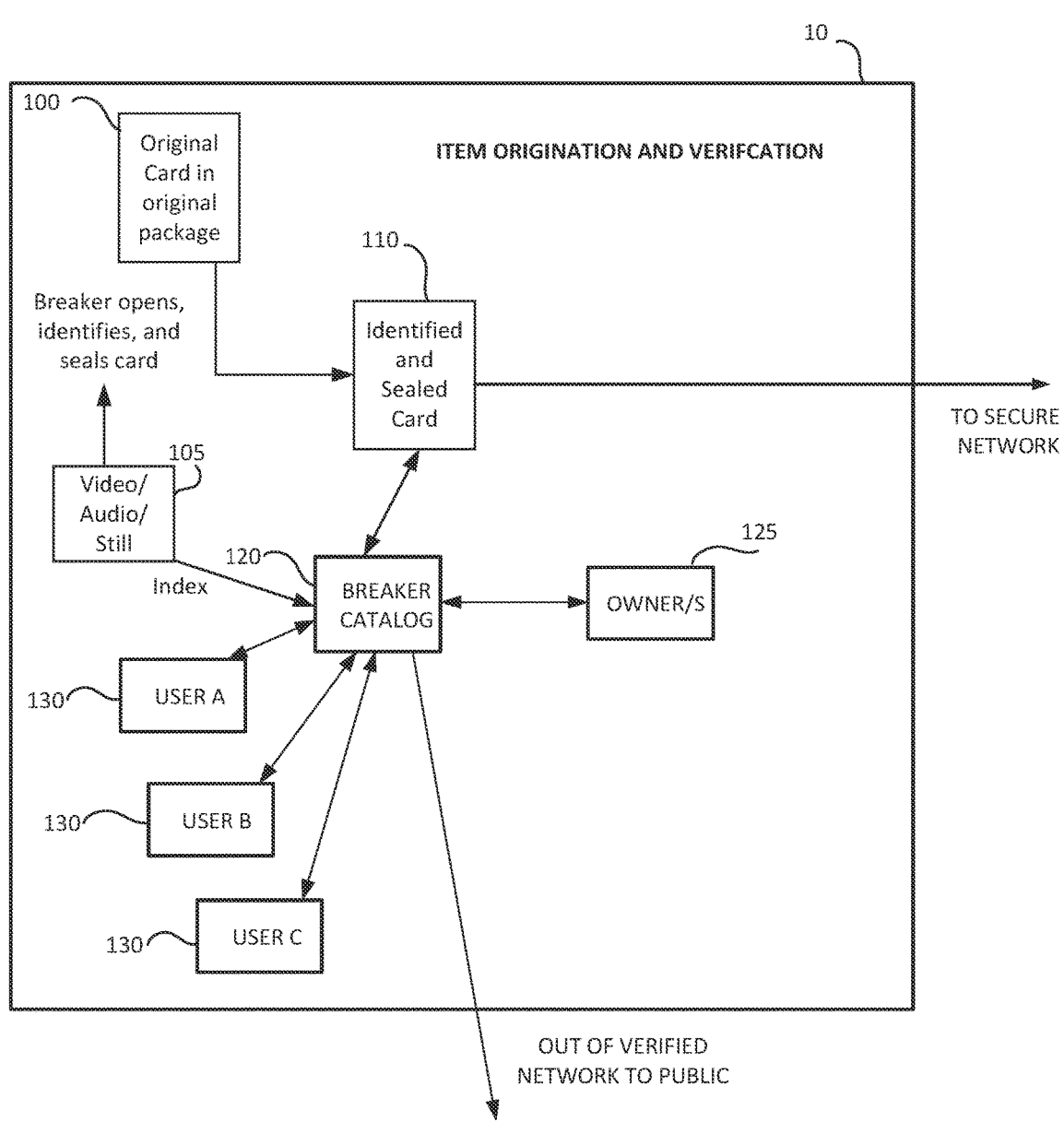
FIG. 1 is a block diagram illustrating how items are originated and verified before being passed to a secure network, according to embodiments of the invention.

Embodiments of the invention are directed to generating unique identifiers of objects using multi-media and other systems. A non-limiting example is described in this disclosure, but embodiments of the invention are not limited to the examples provided below.

A card breaker, or "breaker," is a person who opens a sealed package or many sealed packages of trading cards and extracts the individual cards. Generally, the breaker purchases the sealed packages directly from the manufacturer or from a third party. Breakers may purchase the sealed packages at a discount from retail prices and pre-sell a particular one of the cards, or groups of cards, to a retail purchaser. For example, a breaker may purchase 20 packs of cards and pre-sell the cards contained within the packs to four buyers, with each buyer pre-purchasing 5 packs of cards. In another example, a breaker may purchase 20 packs of cards but only pre-sell 10 packs, and offer the other cards for sale after being opened. In many instances, the breaker records or streams a video of the breaker opening the packages, which may build excitement of the purchasers as they watch the breaker unveil the cards. This excitement may extend to others as well, who may view the video stream over social media to watch the unpackaging, even though they themselves are not owners or did not pre-purchase any of the cards. Certain breakers may become personalities or celebrities within the card community. These breakers' videos may be streamed at a collective site, or channel, available over the internet. The breaker videos may also be stored at particular sites, such as YouTube. There may be so much interest in a particular breaker, or breaker channel, that the breaker can sell advertising or otherwise monetize their breaking experience.

Some embodiments of the invention create a unique identifier for cards opened by breakers, as the packages are opened, and individually associate those unique identifiers to the opened cards, effectively making each card a uniquely identified object. Further, the breaker may associate video, audio, or still images of the breaker opening the cards to the unique identifier, which provides a history of the card opening event. In one embodiment, the cards in the packages are provided a unique identifier as soon as the card is removed from the packaging. One embodiment of the invention generates a unique card identifier, which may be a unique bar code, such as a 2-D barcode, to uniquely identify a particular card. Other unique card identifier may be any unique code, or string of codes, such as an alpha-numeric string, and does not necessarily need to be a barcode. Recall from above that the breaker generally records or streams the action of opening the packages of cards on video. After the card has been associated with a unique code, the portion of the breaker video that includes the actual opening of a particular card is also associated with the unique card identifier that is generated for the card. In some embodiments, the breaker inserts the card into a protective pouch, prints a sticker of the unique 2-D barcode image, then seals the pouch with the sticker. In other embodiments the pouch is sealed with a tamper-proof seal, and then the barcoded sticker is applied to the pouch. Tamper-proof seals are physical seals that change appearance when they have been opened. In other words, it is impossible to break or open a tamper-proof seal without evidence that the seal has been broken. As a result, using tamper-proof seals on sealed packages provides strong evidence of whether the package has been previously opened. In the case of cards, using a tamper proof seal provides evidence that the original card place in the package is the same card when the pouch with the tamper-proof seal is later analyzed. In some embodiments the 2-D barcode image is printed on or is integrated with the tamper-proof seal itself. Although this description of embodiments is generally focused on opening and uniquely identifying cards, embodiments are applicable to any physical object.

Performing these operations is one way to create a unique identifier of an object using multi-media. In this example, the multi-media includes the video of the breaker opening the card from its package, which may be referred to as the "birthday" of the card. Of course, not all these details are required for all embodiments.

FIG. 1 is a block diagram depicting an environment 10 in which this process of creating unique identifiers for verifying the origination of cards or other objects in a resale market may occur. As shown in FIG. 1, in embodiments of the disclosure, a card 100 begins as an unopened opened card in its original package, contents unknown, which is then opened by a breaker. As described above, the opening of the card may be recorded or streamed, such as by video 105. In other embodiments audio recordings or still photos may be generated. After opening, the card is presented with a unique identifier, such as a barcode, and sealed in a pouch that is identified with the unique identifier and becomes identified card 110.

This uniquely identified card 110 may be stored in a breaker catalog 120, which is a list or database of the cards associated with the breaker.

The breaker may then share or publish the breaker's catalog 120 with an owner 125 who has pre-purchased a card or group of cards in the catalog or to a variety of users 130, who may have viewed the breakers' video stream. The breaker's catalog 120 may also be shared publicly.

Other information about the card, or item, may be added to a record, for example in a database, which is also associated with the unique card identifier. Such information may include the date, time, and location that the package was opened and the card extracted. If the breaker was recording the action of opening the card through a mobile phone, the date, time, and location may be extracted automatically from the phone. Other information stored in the record may include the name and/or identification of the breaker who opened the card. Further, the breaker may take still images of the card, such as through the phone, or through other means, which can also be saved in association with the unique record of the card. Other multi-media that may be associated with the unique card identifier includes an audio file with a recording of anything the breaker may have stated when opening the card. An audio file could also include a recording of a third party, such as an expert, opining on the value, uniqueness, or other quality of the card, or this expert information may be merely stored in character form along with the other information.

A sample database 200 for storing information about an item is depicted in FIG. 2. As shown, this sample database 200 includes the item's unique identifier, a description of the item, the identity of the breaker who unpackaged the item, and the date, time, and location the item was unpackaged. However, as discussed above, databases in other embodiments of the disclosure may include more or less information about the item. Also, the sample database 200 of FIG. 2 may be an example of the breaker catalog 120, a supplemental database indexed to the breaker catalog 120 that provides additional information about the uniquely identified cards, or a standalone database for use by a provider of card information, such as a card marketplace operator. Further, although the database 200 is presented as a flat database, any type of database may be used so long as the data stored therein is associated with the unique identifier.

Figure 3:
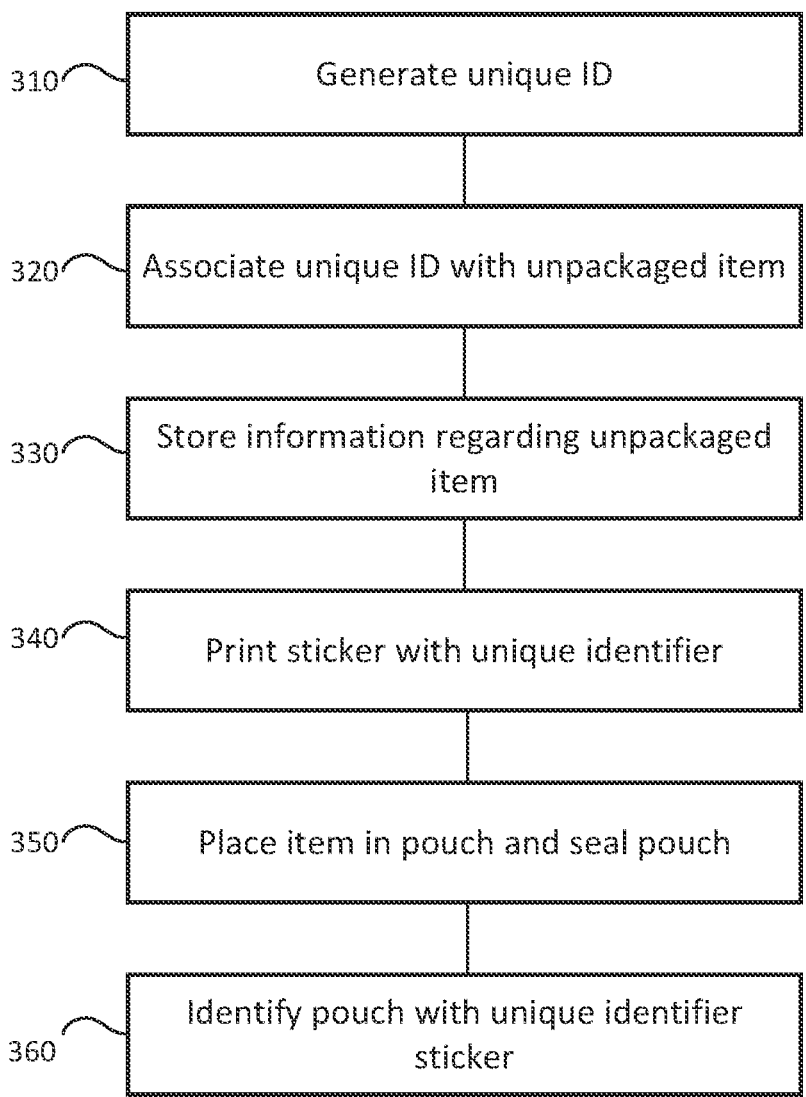
FIG. 3 is a flowchart of a process of generating a unique identifier for objects using multi-media, according to embodiments of the invention.

A flowchart 300 illustrating example operations that may be used in embodiments of the disclosure is depicted in FIG. 3. As shown, a breaker unpacking cards and performing the operations for uniquely identifying each card may first generate a unique identifier at operation 310. For example, the breaker may initiate an operation on a computer, described below, that generates the unique identifier. The unique identifiers may be serially assigned, randomly assigned, or assigned through other processes. In an operation 320, the breaker, or other party, associates the unique identifier generated in operation 310 to a card, or other item being identified. The breaker may then store information about the item at operation 330, storing information such as the breaker's identity, a description of the card, and the date, time, and location the card was unpackaged. Some of this data may be automatically populated in a database, such as obtaining a time and location stamp for a particular breaking action from a phone, computer, or other device present at the breaking. Other data may additionally be populated about the uniquely identified item, such as that described above, or other information that a card collector may find valuable or useful. Next, the breaker may print a sticker with the unique identifier, or use other means of associating the unique identifier with the opened item at an operation 340. Then, the breaker, or another party seals the card or item in a pouch and secures the pouch in an operation 360. As described above, the pouch may be sealed with a tamper-proof seal, or other methods used for sealing the pouch. The sticker printed in operation 340 may then be adhered to the pouch to identify the contents of the pouch with the unique identifier in an operation 360. In some embodiments, the operations 350 and 360 may be combined by sealing the pouch with the unique identifier sticker. Once this process is complete, the pouch containing the uniquely identified item may be moved to a secure location, such as a vault, to provide additional security that the pouch has not been tampered with. In other embodiments, the pouch containing the uniquely identified item may be physically transferred to the owner 125 (FIG. 1), or to someone who purchased the item, such as a user 130. In yet other embodiments, the pouch or pouches of individually identified items may remain with the breaker while they are offered for sale.

Breakers may perform the above-described operations on a computer device, such as a mobile phone, computer server, or other device. In any event, the breaker may run software provided by the owner or operator of a secure network, so that the items being ingested into the secure network adhere to a common framework. That is, each item cataloged through the software will have the same basic format, such as photos, video streams, identification data, etc.

Some of the above process may be automated. In some embodiments, a process may be performed on the video of the card, or subsequent images associated with the card, that identifies the manufacturer of the card as well as the contents of the card itself, such as the player and team identification. Embodiments may use machine learning to train the system to reliably identify cards. In other embodiments, some or all the information about the card may be entered manually, or through voice-recognition software, such as manufacturer, card series, sport, league, team, player, year, status (such as rookie), etc. Some of this data may be pre-populated or duplicated to all the cards in the box, if known, such as manufacturer and year. Metadata may also be stored, such as identification of the box containing the original wax packages, the wax package itself, or other data. If the particular card has been pre-purchased by a user, owner details may be entered and associated with the card as well, including whether or not the owner is interested in selling the card. These details are kept as a database or in spreadsheet form, all of which are indexed to the specific card.

In other embodiments, the records of all the cards, including the unique identifiers and associated multi-media files, are assembled into a catalog of cards, which may be presented to the public, or certain private members, for sale.

Figure 4:
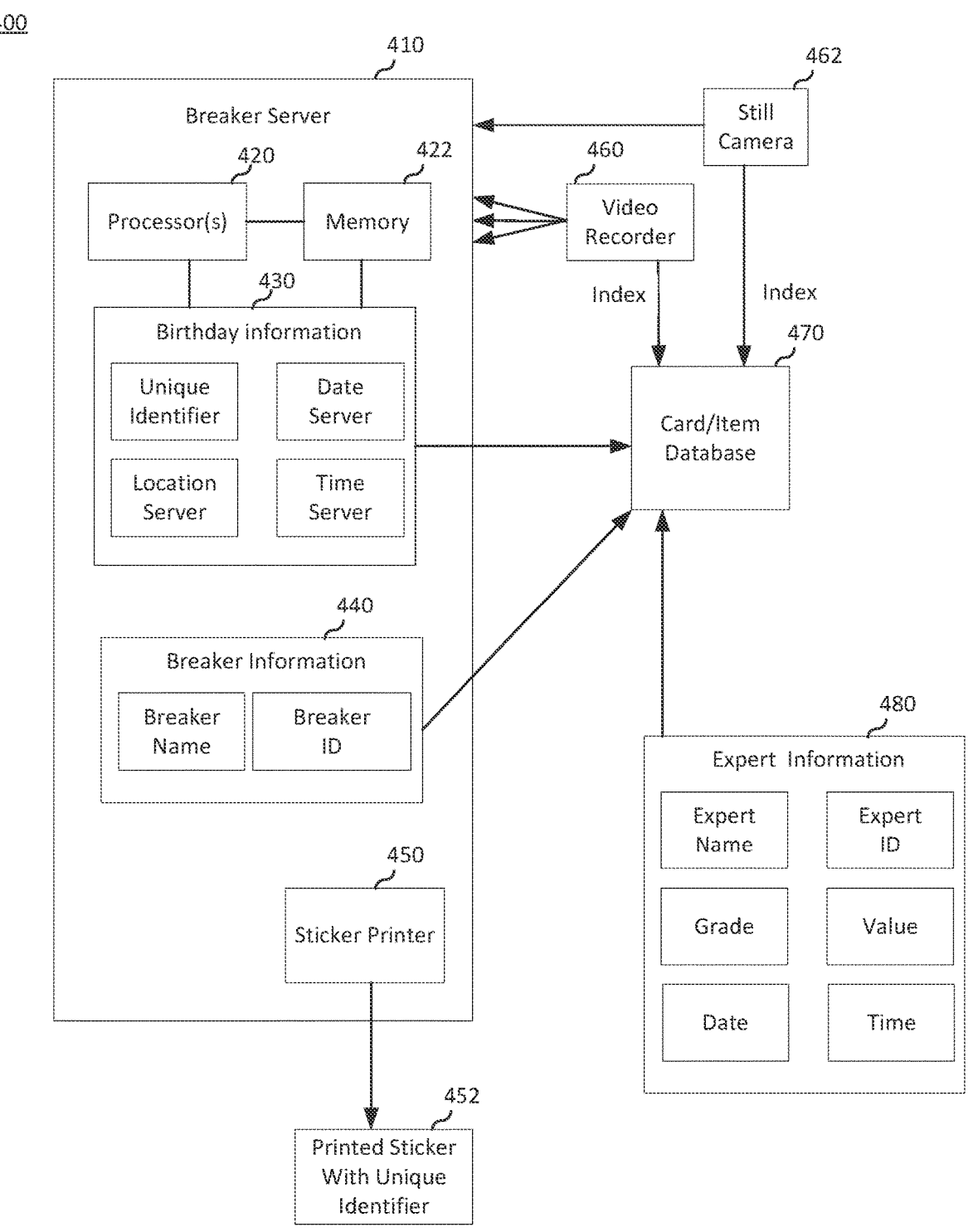
FIG. 4 is a functional block system diagram illustrating an operational network on which embodiments of the invention may operate.

FIG. 4 is a functional block diagram illustrating an operational network 400 on which embodiments of the invention may operate. The operational network 400 generally includes a breaker server 410, a video recorder 460, a still camera 462, which may be integrated into a portable phone, a card/item database 470, on which identification and other information about an item or card may be stored, and, in some cases, expert information 480, which may be an input to the card/item database 470 or stored in an audio file associated with the database. The card/item database may include further information described above and/or with reference to FIG. 2. Not all components of the illustrated operational network 400 are required in all embodiments of the invention. Also, some of the functions separately depicted may be integrated into one or more devices.

The breaker server 410 provides the central functions performed by the breaker, as described above. The breaker server 410 includes one or more processors 420 coupled to a memory 422 in conventional fashion. The memory 422 may include instructions or computer applications to be run on the one or more processors 420. The memory 422 may further include data storage relevant to the functions of the breaker or the breaker network.

Birthday information 430 is provided through functions or operations running on the breaker server 410. In some embodiments this information may be provided by one or more separate devices. Birthday information includes, as described above, a unique identifier to uniquely identify items or cards, as well as date, time, and location servers. In some embodiments, the date, time, and location servers may be operations running on other hardware, such as the video recorder 460, still camera 462, or other device. In operation, the breaker may control the breaker server 410 to generate a unique identifier for each item to be uniquely identified. For instance, the breaker may press a hardware button, or use a mouse or other input to initiate an application or process to generate the unique identifier. All of the birthday information may be sent to the card/item database 470 and indexed to the unique identifier, so that the birthday information may be effectively coupled to the card or item associated with that unique identifier.

Breaker information 440 may include the name and identification of the breaker, which is stored along with the other information indexed to the unique identifier in the card/item database 470.

In some embodiments, an expert may provide additional information about the uniquely identified cards or items stored in the card/item database 470. For example, an expert person or company may provide a grade of the card/item, and perhaps even an opinion of the present value. This information, along with the name, identification, as well as a date, time and perhaps location (not illustrated) that the expert rendered such an opinion may be stored in the card/item database 470 that is indexed to the uniquely identified object.

Further, as described above, the breaker server 410 may include, or be coupled to a sticker printer 450 or other device that prints a physical label of the unique identifier, such as a sticker 452 that may be placed on the item or on an item container, such as a pouch. Then, after the breaker places the item in the pouch, the sticker 452 with the unique identifier may be adhered to or otherwise attached to the pouch, thus uniquely identifying the item stored within.

The video recorder 460 and still camera 462 may take video, audio, and still photos of the item, or the breaker, as it is being opened. Not only does this provide evidence of a physical chain of custody from the time the card is opened until it is placed in the secure pouch, this information may be valuable or enjoyable to the present or future owner of the card. Indices or actual copies of the video recording and still photos may be stored in the card/item database 470 and indexed to the unique identifier. This multi-media collection may have value separate from the uniquely identified item itself, but will likely be most valuable when indexed to the particular card or item that is the subject of the video and/or still photos. Although not specifically described previously, the video information typically also includes audio information recorded coincident with the video and is generally stored as a part of the video file, which is perhaps better described as a video/audio file or snippet.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure.

The invention claimed is:

1. A method comprising:

generating, by a processing device, a media record including a video or image of a person unveiling a previously unknown object from an original package applied by a manufacturer to become an identified object with a known identity;

in response to a user input, generating, by the processing device, a unique identifier of the identified object;

associating, by the processing device, the unique identifier of the identified object with the identified object itself in a catalog stored in a computer database;

indexing, by the processing device, the media record of the unveiling of the object to the unique identifier in the catalog stored in the computer database, wherein the indexing allows for later retrieval of the media record by an entity using the unique identifier;

preparing a physical instance of the unique identifier; and physically attaching the physical instance of the unique identifier to the identified object or a container thereof, the container being separate from the package.

2. The method of claim 1, further comprising:

physically inserting the identified object into the container for the identified object;

sealing the container with the identified object inside the container; and physically attaching the physical instance of the unique identifier to the container.

3. The method of claim 2, in which physically attaching the physical instance of the unique identifier to the container comprises adhering a sticker on which the unique identifier is printed to the container.

4. The method of claim 1, in which associating the unique identifier with the identified object further comprises storing information about the identified object in a database, the information being different from the media record.

5. The method of claim 4, in which storing information about the object in a database includes storing a date, time, and location the media record was generated.

6. The method of claim 4, in which storing information about the object in a database includes storing an identity of the person who performed the unveiling of the previously unknown object.

7. The method of claim 4, in which storing information about the object in a database includes storing an audio file of the person who performed the unveiling of the previously unknown object.

8. The method of claim 4, in which storing information about the object in a database includes storing information from a third party relative to a condition or value of the identified object.

9. The method of claim 1, in which the media record includes a recording of a video stream of the person unveiling the previously unknown object to a remote audience viewing the video stream over a network.

10. The method of claim 1, further comprising receiving the video or image from a mobile phone of the person unveiling the previously unknown object.

11. The method of claim 1, further comprising:

automatically identifying the manufacturer of the previously unknown object using machine learning; and associating the manufacturer with the unique identifier in the computer database.

12. A method comprising:

generating, by a processing device, a media record including a video or image of a person unveiling a previously unknown object from a package to become an identified object with a known identity;

in response to a user input, generating, by the processing device, a unique identifier of the identified object;

associating, by the processing device, the unique identifier of the identified object during a portion of the media record;

printing, by the processing device, the unique identifier on an adhesive sticker using a printer;

physically inserting the identified object into a container for the identified object; and sealing the container with the identified object inside the container with the adhesive sticker.

13. The method of claim 12, in which generating the media record further comprises generating a video or image of the person physically inserting the identified object into the container and sealing the container.

14. The method of claim 12, in which associating the unique identifier with the object further comprises storing information about the object in a database, the information being different from the media record.

15. The method of claim 14, in which storing information about the object in a database includes storing a date, time, and location the media record was generated.

16. The method of claim 12, wherein the media record includes a recording of a video stream transmitted to a remote audience over a network, the video stream showing the person unwrapping the object from the package.

17. A method comprising:

generating, by a processing device, a unique identifier;

generating, by the processing device using a camera, a video recording of a person unwrapping an item from its packaging;

in response to a user input, associating, by the processing device, the unique identifier with the item at a time in which the item is unwrapped from its packaging by the person during the video recording;

associating, by the processing device, the unique identifier with additional information about the time at which the item is unpackaged, the additional information being different from the video recording;

printing, by the processing device, the unique identifier on a sticker using a printer; and adhereing the sticker with the unique identifier to a portion of the item.

18. The method of claim 17, in which associating the unique identifier with additional information includes storing a date, time, and location that the item was featured in the video recording.

19. The method of claim 17, wherein the video recording includes a recording of a video stream transmitted to a remote audience over a social media network, the video stream showing the person unwrapping the item from the packaging.

\* \* \* \* \*